(12) United States Patent
Arvidson et al.

(10) Patent No.: US 8,609,058 B2
(45) Date of Patent: Dec. 17, 2013

(54) SILICON PRODUCTION WITH A FLUIDIZED BED REACTOR INTEGRATED INTO A SIEMENS-TYPE PROCESS

(75) Inventors: Arvid Neil Arvidson, Sanford, MI (US); Michael Molnar, Midland, MI (US)

(73) Assignee: Hemlock Semiconductor Corporation, Hemlock, MI (US)

( * ) Notice: Subject to any disclaimer, the term of this patent is extended or adjusted under 35 U.S.C. 154(b) by 201 days.

(21) Appl. No.: 13/052,407

(22) Filed: Mar. 21, 2011

(65) Prior Publication Data
US 2011/0189074 A1 Aug. 4, 2011

Related U.S. Application Data

(63) Continuation of application No. 11/512,853, filed on Aug. 30, 2006, now Pat. No. 7,935,327.

(51) Int. Cl.
| C01B 33/04 | (2006.01) |
| B01J 8/00 | (2006.01) |
| B01J 10/00 | (2006.01) |
| B01J 8/18 | (2006.01) |
| F27B 15/00 | (2006.01) |

(52) U.S. Cl.
USPC ........... 423/349; 423/348; 422/600; 422/620; 422/139

(58) Field of Classification Search
USPC ................... 423/348, 349; 422/600, 630, 139
See application file for complete search history.

(56) References Cited

U.S. PATENT DOCUMENTS

| 2,999,735 A | 9/1961 | Reuschel |
| 3,011,877 A | 12/1961 | Schweickert et al. |
| 3,745,043 A | 7/1973 | Bradley |
| 3,862,020 A | 1/1975 | Woerner et al. |
| 3,961,003 A | 6/1976 | Parsels |
| 4,318,942 A | 3/1982 | Woerner et al. |
| 4,481,232 A | 11/1984 | Olson |
| 4,491,604 A | 1/1985 | Lesk et al. |
| 4,559,219 A | 12/1985 | Herrick |
| 4,676,967 A | 6/1987 | Breneman |
| 4,818,495 A | 4/1989 | Iya |
| 4,883,687 A | 11/1989 | Gautreaux et al. |
| 5,037,503 A | 8/1991 | Kajimoto et al. |
| 5,077,028 A | 12/1991 | Age et al. |
| 5,118,486 A * | 6/1992 | Burgie et al. ................. 423/349 |

(Continued)

FOREIGN PATENT DOCUMENTS

| GB | 2028289 A1 | 3/1980 |
| JP | 60-036317 A | 2/1985 |

(Continued)

OTHER PUBLICATIONS

PCT International Search Report for PCT/US2007/013905, dated Jan. 3, 2008.

(Continued)

Primary Examiner — Melvin C Mayes
Assistant Examiner — Michael Forrest
(74) Attorney, Agent, or Firm — Howard & Howard Attorneys PLLC

(57) ABSTRACT

A fluidized bed reactor and a Siemens reactor are used to produce polycrystalline silicon. The process includes feeding the vent gas from the Siemens reactor as a feed gas to the fluidized bed reactor.

26 Claims, 2 Drawing Sheets

(56) References Cited

U.S. PATENT DOCUMENTS

| | | |
|---|---|---|
| 5,242,671 A | 9/1993 | Allen et al. |
| 6,007,869 A | 12/1999 | Schreiedar et al. |
| 6,060,021 A | 5/2000 | Oda |
| 6,368,568 B1 | 4/2002 | Lord |
| 6,395,248 B1 | 5/2002 | Kim |
| 7,033,561 B2 * | 4/2006 | Kendig et al. ............ 423/349 |
| 2002/0187096 A1 | 12/2002 | Kendig et al. |
| 2003/0223909 A1 * | 12/2003 | Oberbeck et al. ............ 422/99 |

FOREIGN PATENT DOCUMENTS

| | | |
|---|---|---|
| JP | 06-080412 A | 3/1994 |
| JP | 11-139817 A | 5/1999 |
| JP | 2004-532786 A | 10/2004 |
| JP | 2005-314191 A | 11/2005 |
| JP | 2005-336045 A | 12/2005 |

OTHER PUBLICATIONS

Handbook: Hunt, Lee P., Handbook of Semiconductor Silicon Technology, Noyes Publications, 1990, pp. 2-16.

English language abstract and translation for JP 06-080412 extracted from the PAJ database on Sep. 12, 2012, 33 pages.

English language abstract and translation for JP 11-139817 extracted from the PAJ database on Sep. 12, 2012, 25 pages.

See English language equivalent US 4,481,232 for English abstract for JP 60-036317. Original Document extracted from the espacenet.com database on Sep. 14, 2012, 10 pages.

See English language equivalent US 7,033,561 for English abstract for JP 2004-532786. Original Document extracted from the espacenet.com database on Sep. 12, 2012, 28 pages.

* cited by examiner

SILICON PRODUCTION WITH A FLUIDIZED BED REACTOR INTEGRATED INTO A SIEMENS-TYPE PROCESS

CROSS-REFERENCE TO RELATED APPLICATIONS

This present application is a continuation of Ser. No. 11/512,853, which was filed on Aug. 30, 2006, now U.S. Pat. No. 7,935,327.

BACKGROUND

It is known that silicon can be made in rod form by a process referred to as the Siemens process. A mixture comprising hydrogen and silane ($SiH_4$) or a mixture comprising hydrogen and trichlorosilane is fed to a decomposition reactor containing, substrate rods which are kept at a temperature of more than 1000° C. Silicon is deposited on the substrate and by-product gas mixtures exit in a vent stream. When a mixture comprising hydrogen and trichlorosilane is used, the vent stream may include hydrogen, hydrogen chloride, chlorosilanes, silane, and silicon powder. For purposes of this application, the term 'chlorosilanes' refers to any silane species having one or more chlorine atoms bonded to silicon and includes, but is not limited to monochlorosilane ($H_3SiCl$), dichlorosilane ($H_2SiCl_2$), trichlorosilane ($HSiCl_3$), silicon tetrachloride ($SiCl_4$), and various chlorinated disilanes such as hexachlorodisilane and pentachlorodisilane. In the vent stream, hydrogen and chlorosilanes such as silicon tetrachloride and trichlorosilane may be present both from un-reacted feed gas and reaction product from the decomposition. The vent stream is passed through a complex recovery process where condensations, scrubbing, absorption and adsorption are unit operations often used to facilitate the capture of feed material trichlorosilane and hydrogen for recycle. One problem associated with the Siemens process is that it is difficult to achieve a high yield of polycrystalline silicon product to silicon fed due to the chemical equilibria and kinetics that control this reaction process.

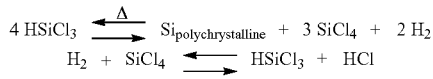

Quite often only 50%, or less, of the maximum theoretical yield of polycrystalline silicon is achieved.

An alternate process is to feed the mixture comprising hydrogen and silane or the mixture comprising hydrogen and trichlorosilane to a fluidized bed containing silicon nearly spherical beads that are maintained also at high temperature. The beads grow in size, and when large enough, are passed out the bottom of the fluidized bed reactor as product. The vent gases exit the top of the reactor and are sent through a recovery process similar to the one described above for the Siemens process. Yield in this system may be nearly 90% of theoretical maximum, as compared to the 50% for the Siemens process.

One problem with the fluidized bed reactor process is that one must heat the beads to a temperature higher than the average bed temperature to facilitate heat transfer. That can be done, for example, by use of hot walled reactor, microwave energy, or infrared radiation. All heating methods have unique operating problems. One problem, however, is that the bottom of the fluidized bed reactor may be hot, and the feed gas is reactive when it contains only trichlorosilane and hydrogen. As a result, the feed gas distributor, large beads, and reactor side walls are prone to rapid deposition of silicon. Those deposits subsequently disrupt the proper feed distribution, product separation, and heat transfer of the system. Another problem with the fluidized bed reactor process is the product quality is generally insufficient for use in integrated circuit manufacture; however, the product of the fluidized bed reactor process may be used in solar grade applications.

There is a need in the polycrystalline silicon industry to improve efficiency of polycrystalline silicon production and reduce by-products.

SUMMARY

A process comprises feeding a vent gas stream from a Siemens reactor to a fluidized bed reactor.

REFERENCE NUMERALS

Figure 1:
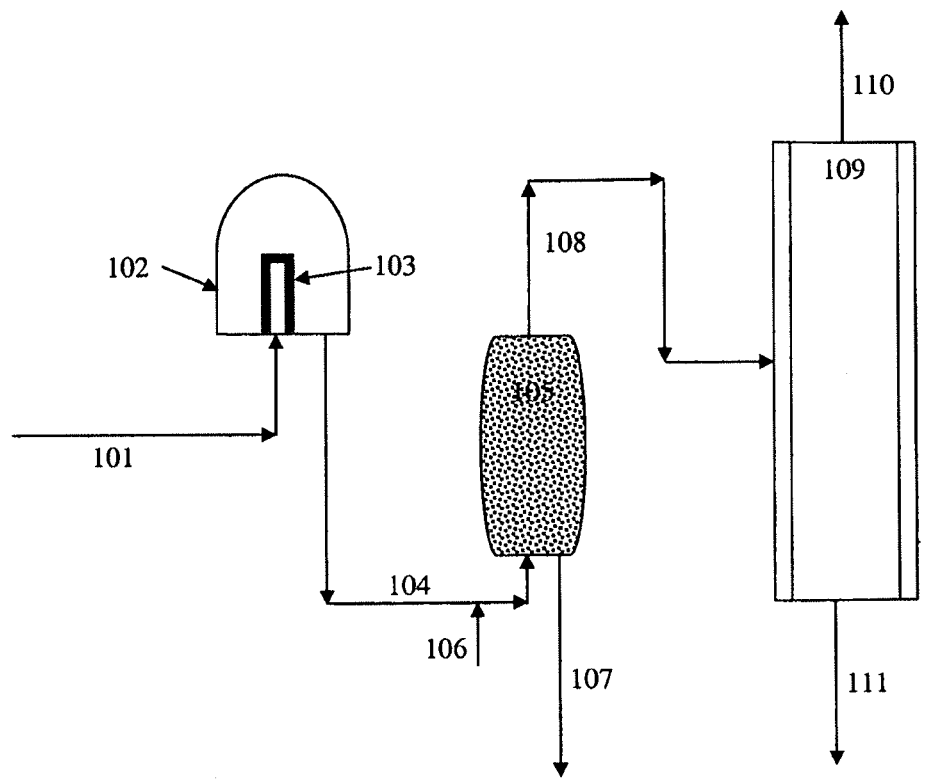
FIG. 1 is a flow diagram of a process described herein.

101 Siemens feed gas stream
102 Siemens reactor
103 polycrystalline silicon rod
104 Siemens vent gas stream
105 fluidized bed reactor
106 supplement stream
107 polycrystalline silicon bead product stream
108 fluidized bed reactor vent gas stream
109 recovery system
110 hydrogen recovery line
111 chlorosilane recovery line
201 dust removing apparatus
202 condensate line
203 treated vent gas stream
204 vaporizer
205 overhead vapor line

DETAILED DESCRIPTION

To avoid duplicity of the feed and recovery systems for fluidized bed reactors and Siemens reactors, a fluidized bed reactor is placed such that the vent gas stream exiting a Siemens reactor is enters a fluidized bed reactor as a feed gas stream. FIG. 1 shows a process flow diagram. A Siemens feed gas stream 101 is fed to a Siemens reactor 102 containing a U-rod. The Siemens feed gas stream may comprise trichlorosilane. Alternatively, the Siemens feed gas stream may comprise silane. The U-rod may comprise two polycrystalline silicon seed rods connected together by a polycrystalline silicon bridge. Polycrystalline silicon is deposited from the feed gas stream 101 onto the U-rod to produce polycrystalline silicon product in rod form 103. The product in rod form 103 is removed from the Siemens reactor 102 at the end of a batch. The vent gas stream 104 from the Siemens reactor may comprise trichlorosilane, silicon tetrachloride, hydrogen, hydrogen chloride and silicon powder.

The vent gas stream 104 is fed into a fluidized bed reactor 105 containing silicon seed particles. This vent gas stream 104 may optionally be supplemented with additional feed gases, with additional inert gases, or both, in supplement stream 106. The supplement stream 106 may comprise additional chlorosilanes. The additional chlorosilanes may comprise trichlorosilane, silicon tetrachloride, or combinations thereof. Polycrystalline silicon is deposited from the feed gas stream(s) 104, 106 onto the silicon seed particles. Polycrystalline silicon product in bead form is removed from the fluidized bed reactor 105 in product stream 107. A vent gas stream 108 may comprise hydrogen, hydrogen chloride, and chlorosilanes, e.g., trichlorosilane and silicon tetrachloride, is removed from the fluidized bed reactor 105 and sent to recovery system 109. Hydrogen may be recovered and sent back to the Siemens reactor 102 through line 110. Chlorosilanes may be recovered through line 111 and recycled or sold. Hydrogen chloride may be recovered and sold. Silicon tetrachloride may be hydrogenated or otherwise converted to trichlorosilane, and the resulting trichlorosilane may be recycled to the Siemens reactor 102.

Siemens Reactor

The Siemens reactor used in this invention may be a conventional Siemens reactor, such as a Siemens reactor disclosed in U.S. Pat. Nos. 2,999,735; 3,011,877; 3,862,020; or 3,961,003. For example, operation of the Siemens reactor may be performed as follows. Polycrystalline silicon seed rods are placed upright and parallel to one another in the Siemens reactor. Two or more of these seed rods may be connected to one another by a bridge, thereby forming a U-rod. The U-rods are heated until they reach a temperature ranging from 700° C. to 1,400° C., alternatively 1,000° C. to 1,200° C., alternatively 1,100° C. to 1,150° C. The Siemens reactor may be operated at a pressure ranging from 13 kPa (2 psig) to 3450 kPa (500 psig), alternatively 6 kPa (1 psig) to 1380 kPa (200 psig), and alternatively 100 kPa (1 bar) to 690 kPa (100 psig).

The Siemens feed gas is fed to the Siemens reactor through an inlet in the base. The Siemens feed gas may comprise hydrogen and trichlorosilane. The Siemens feed gas may optionally further comprise silicon tetrachloride. Silicon is deposited from the feed gas onto the U-rod, thereby increasing the diameter of the U-rod. The Siemens feed stream may comprises 5% to 75% trichlorosilane. The Siemens feed gas may comprise 0.015 moles of trichlorosilane per mole of hydrogen to 0.3 moles of trichlorosilane per mole of hydrogen. Alternatively, the Siemens feed gas may comprise 0.03 moles of trichlorosilane per mole of hydrogen to 0.15 moles of trichlorosilane per mole of hydrogen. Without wishing to be bound by theory, it is thought that the amount of polycrystalline silicon product ranging from 20% to 40% based on the total quantity of silicon contained in the Siemens feed gas may be obtained from the Siemens reactor.

Figure 2:
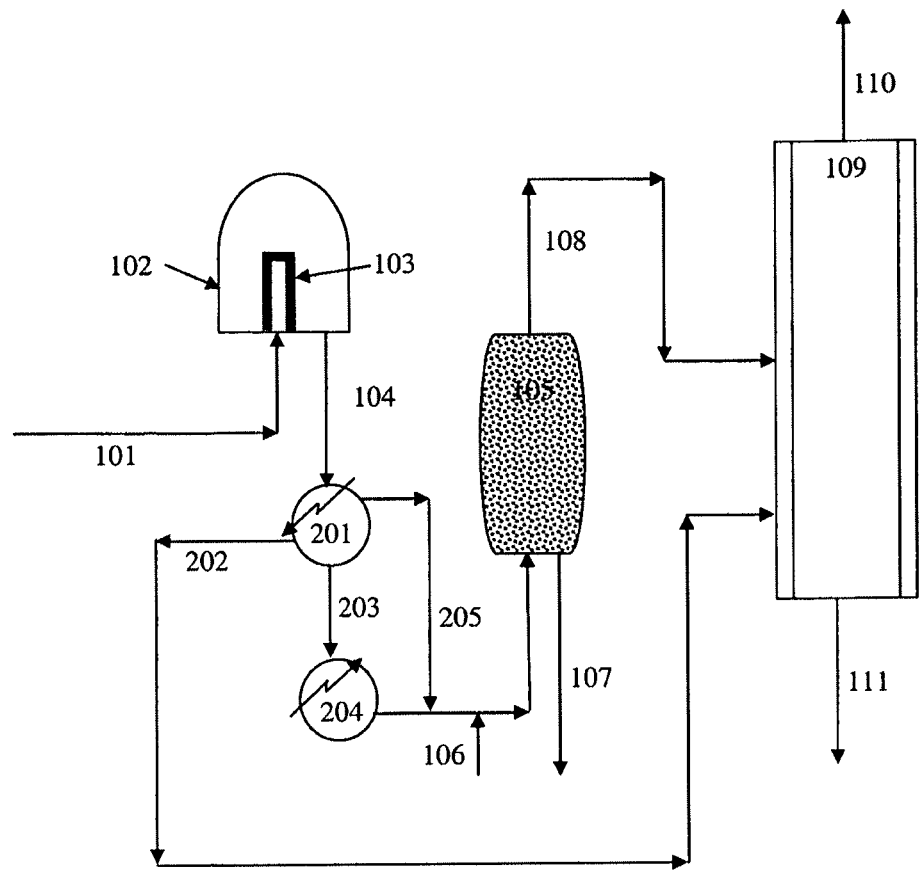
FIG. 2 is a flow diagram of an alternative process described herein.

The vent gas stream from the Siemens reactor may be fed directly to the fluidized bed reactor without intervening treatment steps (without any unit operations between the Siemens reactor and the fluidized bed reactor). Alternatively, the vent gas stream from the Siemens reactor may be treated to remove certain species before being fed into the fluidized bed reactor. FIG. 2 shows a process flow diagram of this process. The vent gas stream 104 from the Siemens reactor 102 may be treated, for example, by feeding the vent gas stream 104 through a dust removing apparatus 201, which is cooled with fluid such as service water, thereby removing fine silicon powder, disilanes, or combinations thereof through line 202. The dust removing apparatus 201 may comprise a sintered metal blowback filter, a contact condenser, or a combination thereof (for example, a sintered metal blowback filter located either upstream or downstream of a contact condenser in the stream 104 line. The resulting treated vent gas stream 203 comprising trichlorosilane (i.e., with fine silicon powder, disilanes, or both, removed) may then be heated, using for example, a vaporizer 204. The overhead vapor from the contact condenser 205 comprises hydrogen and non-condensable chlorosilanes. The overhead vapor 205 and the treated vent gas stream 203 may optionally then be recombined and fed to the fluidized bed reactor 105. Without wishing to be bound by theory, it is thought that although this treatment step requires more energy and capital than directly feeding the vent gas stream 104 from the Siemens reactor 102 to the fluidized bed reactor 105, it is still more efficient than building a stand-alone process because existing capital assets from the Siemens technology can be used.

Fluidized Bed Reactor

The fluidized bed reactor used in this invention may be a conventional fluidized bed reactor, such as a fluidized bed reactor disclosed in U.S. Pat. No. 5,077,028. For example, operation of the fluidized bed reactor may be performed as follows. Seed particles of silicon are placed in a fluidized bed reactor and fluidized. Sources of seed particles are known in the art. For example, seed particles may be obtained by mechanical attrition of granular polycrystalline silicon or by crushing polycrystalline silicon produced in a Siemens reactor. The gas used to fluidize the bed may comprise the vent gas stream from the Siemens reactor; a diluent gas such as hydrogen, argon, helium, nitrogen; or a combination thereof. Silicon is deposited on the surface of the seed particles, increasing their diameters. The resulting product in bead form may be removed from the fluidized bed, and more seed particles may be introduced.

The temperature inside the fluidized bed reactor may range from 900° C. to 1420° C., alternatively 1100° C. to 1300° C., and alternatively 1100° C. to 1250° C. Feeding the vent gas stream from the Siemens reactor directly into the fluidized bed reactor may offer the advantage of energy savings by having to provide less heat to the fluidized bed reactor. The concentration of chlorosilanes in the feed stream to the fluidized bed reactor may range from 20 mol % to 50 mol %. Without wishing to be bound by theory, it is thought that excessive amounts of fine powder may form if the concentration of chlorosilanes is higher than 50%. The average diameter of the fluidized silicon particles may range from 0.5 mm to 4 mm, alternatively 0.6 mm to 1.6 mm The residence time of the fluidized bed may range from 0.5 second to 2 seconds. The minimum fluidization velocity and design operational velocity may be determined by one of ordinary skill in the art based on various factors. The minimum fluidization velocity may be influenced by factors including gravitational acceleration, fluid density, fluid viscosity, solids density, and solids particle size. The operational velocity may be influenced by factors including heat transfer and kinetic properties, such as height of the fluidized bed, total surface area, flow rate of silicon precursor in the feed gas stream, pressure, gas and solids temperature, concentrations of species, and thermodynamic equilibrium point.

One skilled in the art will recognize that the Siemens reactor operates in a batch process, and the fluidized bed reactor operates in a continuous process. Furthermore, the vent gas composition leaving the Siemens reactor may vary during the course of a batch. Therefore, one skilled in the art would recognize that vent gases from multiple (two or more) Siemens reactors may be combined to form a vent gas stream fed to the fluidized bed reactor, or the feed gas stream to the fluidized bed reactor may be supplemented with additional trichlorosilane, silicon tetrachloride, hydrogen, or a combination thereof, for example, to minimize variability of the feed gas stream to the fluidized bed reactor. Furthermore, the vent gas stream from the Siemens reactor may be fed to one or more fluidized bed reactors configured in parallel. Without wishing to be bound by theory, it is thought that supplementing the feed gas stream to the fluidized bed reactor with chlorosilanes comprising trichlorosilane may increase silicon production rate. Without wishing to be bound by theory, it is thought that supplementing the feed gas stream to the fluidized bed reactor with silicon tetrachloride may prevent undesired deposition such as on heater walls and feed distributors.

Without wishing to be bound by theory, the fluidized bed reactor may have deposition of the difference of yield, 90% to 50%, or 40% of theoretical maximum. Without wishing to be bound by theory it is thought that another advantage of this process is that the partially-converted feed gases from the Siemens reactor are of a composition that is not able to deposit silicon at temperatures above 1250° C. That detail allows for design of heating system by a hot wall reactor, resistively-heated feed tube, or other means more efficient than commonly used in a fluidized bed reactor process.

The disclosure of ranges includes the range itself and also anything subsumed therein, as well as endpoints. For example, disclosure of a range of 700 to 1,400 includes not only the range of 700 to 1,400, but also 700, 850, 1000 and 1400 individually, as well as any other number subsumed in the range. Furthermore, disclosure of a range of, for example, 700 to 1400 includes the subranges of, for example, 1000 to 1400 and 1000 to 1100, as well as any other subrange subsumed in the range. Similarly, the disclosure of Markush groups includes the entire group and also any individual members and subgroups subsumed therein. For example, disclosure of the Markush group hydrogen, trichlorosilane, tetrachlorosilane, and hydrogen chloride includes the member hydrogen individually; the subgroup trichlorosilane and tetrachlorosilane; and any other individual member and subgroup subsumed therein.

Recovery System

The vent gas stream from the fluidized bed reactor may be recovered by any conventional means. The vent gas stream from the fluidized bed reactor may be cooled using conventional equipment. Fine silicon powder may be removed using conventional equipment such as a contact condenser, sintered metal blowback filtration assembly, or a combination of a cyclone and filter assembly.

Alternatively, the vent gas stream from the fluidized bed reactor may be fed to a contact condenser to knock down the solids in liquid chlorosilanes and thereafter spray dry the fine silicon powder may be spray dried in a spray dryer. The resulting silicon powder may be neutralized and sold. Alternatively, the fine silicon powder and chlorosilanes may be recovered and converted to chlorosilanes for use as a feed stream to the Siemens reactor. One skilled in the art would be able to select a suitable recovery system without undue experimentation.

INDUSTRIAL APPLICABILITY

The combined benefits of no duplicity of feed and recovery systems and easier heating of the process may make the integral fluidized bed reactor with a Siemens reactor process more manageable and economic. The polycrystalline silicon product of the Siemens reactor may be suitable for either solar cell or integrated circuit applications. The polycrystalline silicon product of the fluidized bed reactor may be suitable for solar cell applications.

The invention claimed is:

1. A process comprising:

feeding a Siemens feed gas stream comprising silane or trichlorosilane to multiple Siemens reactors configured in parallel and containing polycrystalline silicon seed rods;

combining vent gases from the multiple Siemens reactors to form a vent gas stream; and feeding the vent gas stream to fluidized bed reactors configured in parallel and containing seed particles of silicon, where residence time in the fluidized bed reactors ranges from 0.5 to 2 seconds, where the vent gas stream comprises tetrachlorosilane in addition to silane or trichlorosilane, where polycrystalline silicon is produced in the one or more fluidized bed reactors, and where polycrystalline silicon is produced in the Siemens reactors.

2. The process of claim 1, where the vent gas stream comprises hydrogen and chlorosilanes.

3. The process of claim 2, further comprising supplementing the vent gas stream with additional chlorosilanes.

4. The process of claim 3, where the additional chlorosilanes comprise trichlorosilane, silicon tetrachloride, or a combination thereof.

5. The process of claim 2, where the vent gas stream comprises trichlorosilane, silicon tetrachloride, hydrogen, hydrogen chloride and silicon powder.

6. The process of claim 5, further comprising removing silicon powder from the vent gas stream before feeding the vent gas stream to the fluidized bed reactor.

7. The process of claim 2, where the vent gas stream is supplemented with additional trichlorosilane to form a feed gas stream to the fluidized bed reactor.

8. The process of claim 7, where the feed gas stream to the fluidized bed reactor comprises a concentration of chlorosilanes ranging from 20 mol % to 50 mol %.

9. The process of claim 2, further comprising feeding a second vent gas stream from the fluidized bed reactor to a recovery system.

10. The process of claim 9, where the second vent gas stream comprises hydrogen, trichlorosilane, tetrachlorosilane, and hydrogen chloride.

11. The process of claim 9, further comprising recovering hydrogen, trichlorosilane, or both, and feeding the hydrogen, trichlorosilane, or both, to the Siemens reactor.

12. The process of claim 9, further comprising recovering tetrachlorosilane, converting the tetrachlorosilane to trichlorosilane, and feeding the trichlorosilane to the Siemens reactor.

13. The process of claim 1, where the vent gas stream comprises hydrogen and silane.

14. The process of claim 1, further comprising feeding the vent gas stream to a condenser before feeding the vent gas stream to fluidized bed reactors configured in parallel.

15. A process comprising:

feeding a Siemens feed gas stream comprising silane or trichlorosilane to Siemens reactors configured in parallel and containing polycrystalline silicon seed rods;

combining vent gases from the Siemens reactors to form a vent stream; and feeding the vent gas stream to one or more fluidized bed reactors containing seed particles of silicon during production of polycrystalline silicon, where the vent gas stream comprises tetrachlorosilane in addition to silane or trichlorosilane, where residence time in the fluidized bed ranges from 0.5 to 2 seconds, and where polycrystalline silicon is produced in the one or more fluidized bed reactors.

16. The process of claim 15, where the vent gas stream comprises hydrogen and chlorosilanes.

17. The process of claim 16, where the vent gas stream comprises trichlorosilane, silicon tetrachloride, hydrogen, hydrogen chloride and silicon powder.

18. The process of claim 16, further comprising feeding a second vent gas stream from the fluidized bed reactor to a recovery system.

19. The process of claim 18, where the second vent gas stream comprises hydrogen, trichlorosilane, tetrachlorosilane, and hydrogen chloride.

20. The process of claim 18, further comprising recovering hydrogen, trichlorosilane, or both, and feeding the hydrogen, trichlorosilane, or both, to the Siemens reactor.

21. The process of claim 18, further comprising recovering tetrachlorosilane, converting the tetrachlorosilane to trichlorosilane, and feeding the trichlorosilane to the Siemens reactor.

22. The process of claim 15, where the vent gas stream comprises hydrogen and silane.

23. The process of claim 15 where seed particles of silicon are placed in the fluidized bed reactor and fluidized.

24. The process of claim 15 where the vent gas stream from the one or more Siemens reactors is of a composition that is not able to deposit silicon at temperatures above 1250° C.

25. The process of claim 15 where the vent gas stream comprises hydrogen and chlorosilanes, and where the process further comprises the step of feeding a second vent gas stream from the one or more fluidized bed reactors to a recovery system.

26. The process of claim 15, further comprising feeding the vent gas stream from the Siemens reactors to a condenser before feeding the vent gas stream to the one or more fluidized bed reactors.

* * * * *